UNITED STATES PATENT OFFICE.

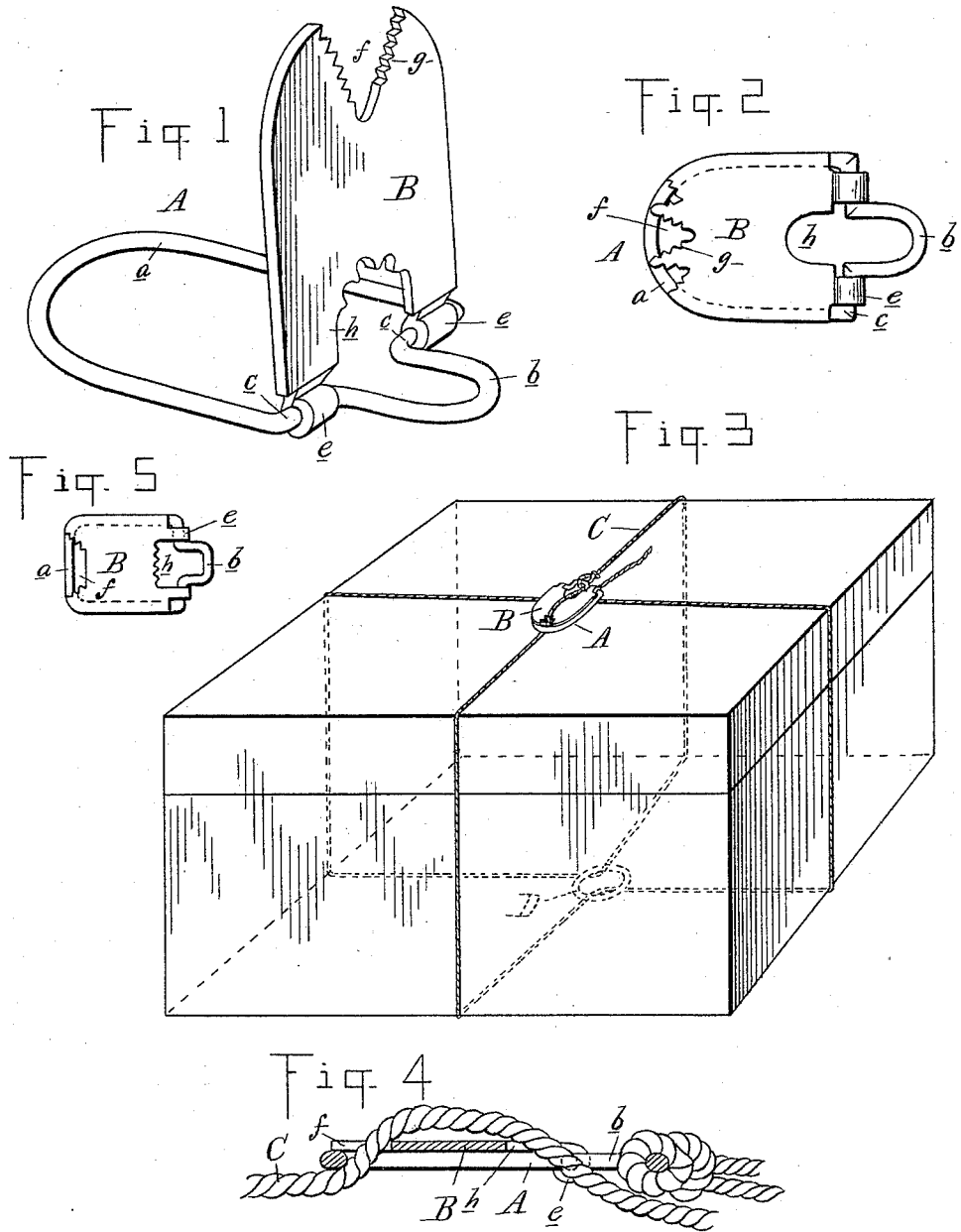

JESSE KINNEY, OF DETROIT, MICHIGAN, ASSIGNOR OF ONE-HALF TO W. W. PETHERICK AND J. W. ALSTON, BOTH OF SAME PLACE.

ROPE-CLAMP.

SPECIFICATION forming part of Letters Patent No. 419,960, dated January 21, 1890.

Application filed May 27, 1889. Serial No. 312,288. (No model.)

*To all whom it may concern:*

Be it known that I, JESSE KINNEY, a citizen of the United States, residing at Detroit, in the county of Wayne and State of Michigan, have invented certain new and useful Improvements in Rope-Clamps, of which the following is a specification, reference being had therein to the accompanying drawings.

This invention relates to new and useful improvements in a rope clamp or buckle for fastening ropes, strings, laces, straps, &c.; and the invention consists in the peculiar construction, arrangement, and combination of the parts, all as more fully hereinafter described, and shown in the accompanying drawings, in which—

Figure 1 is a perspective view of my device. Fig. 2 is a plan of a slightly-modified construction. Fig. 3 is a perspective view showing it applied for use. Fig. 4 is a longitudinal section through the device, as in Fig. 3. Fig. 5 is a modification adapted for bands or straps.

The frame of the buckle is preferably formed of a piece of wire A, with the large loop or bail $a$ and the small loop or bail $b$ connected by the right-angled offsets $c$. A jaw B, formed, preferably, of sheet metal, corresponding to the loop or bail $a$, is hinged to the offsets $c$, suitable ears $e$ being preferably formed integral with the jaw B. To the free end of this movable jaw is formed a V-shaped notch $f$, preferably provided with serrated, sharpened, or indented edges $g$, or several V-shaped notches of different sizes may be provided, as shown in Fig. 2. A similar notch $h$ is formed at the hinged end of the movable jaw between the ears of the hinge.

In practice, the device being constructed substantially as shown and described, it is intended to secure the ends of a rope as in tying up bundles or in clamping the end of a rope, lace, or string, as when used for holding the end of a lace-string in boots or shoes. In Fig. 3 I show it as in use for securing a tie-rope around a box, bundle, or trunk, the rope C being fastened at one end to the small loop $b$ in any suitable manner, and after passing it around the bundle (using a ring D, or other means for crossing the rope, if desired) the free end is passed through the large loop and the rope tightened. Then by forcibly depressing the hinged jaw the rope is clamped into the notch, so as to bite or clamp it firmly, after which the free end is further secured by passing it through the notch $h$ and loop $b$.

My device, constructed of proper sizes, is adapted for a large number of applications—such as for a glove-fastener, lace-fastener for holding the tie-string of an umbrella, &c. In applications of this kind the device is secured by sewing, or otherwise securing the small loop $b$ to the article, its manner of use being self-evident from the above description.

For flat ropes, bands, or straps I slightly modify the construction, as shown in Fig. 5, wherein the notches are cut more rectangular.

It will be seen that by holding the free end of the rope in the notch the tension of the rope tends to hold the jaw closed and the rope clamped at all times.

What I claim as my invention is—

1. In a buckle for fastening ropes, strings, straps, &c., the combination of the frame formed with the loops $a$ and $b$ and offsets $c$, the hinged jaw B, provided with the notches $f$ and $h$, substantially as described.

2. As an improved article of manufacture, the herein-described fastening device, consisting of the frame formed of wire, with the loops $a$ and $b$ and offsets $c$, and the movable jaw formed with the hinge-ears $e$ and the V-shaped indented notches $f$ and $h$, substantially as described.

In testimony whereof I affix my signature, in presence of two witnesses, this 15th day of December, 1889.

JESSE KINNEY.

Witnesses:
JAMES WHITTEMORE,
ED. MCBREARTY.